(No Model.)
C. W. MARK.
ILLUMINATING TILE.
No. 456,046. Patented July 14, 1891.
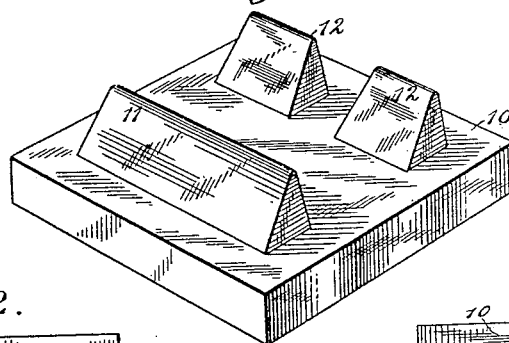
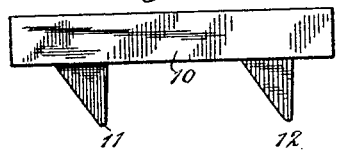
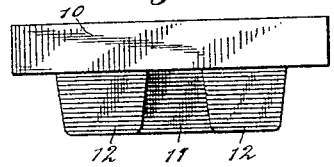
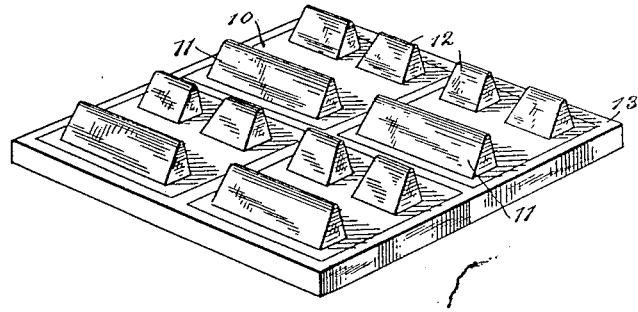
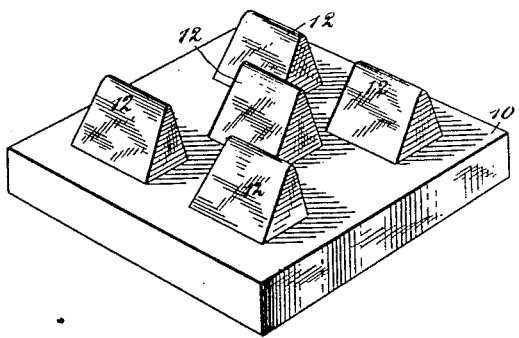
WITNESSES:
J. H. Thiberath.
C. Sedgwick
INVENTOR:
C. W. Mark
BY Munn & Co.
ATTORNEYS

UNITED STATES PATENT OFFICE.

CHARLES W. MARK, OF NEW YORK, N. Y.

ILLUMINATING-TILE.

SPECIFICATION forming part of Letters Patent No. 456,046, dated July 14, 1891.

Application filed April 4, 1891. Serial No. 387,604. (No model.)

*To all whom it may concern:*

Be it known that I, CHARLES W. MARK, of the city, county, and State of New York, have invented a new and useful Improvement in Illuminating-Tiles, of which the following is a full, clear, and exact description.

My invention relates to improvements in illuminating-tiles; and the object of my invention is to produce a lens for tiles of the character described, which lens is constructed in such a manner that it cannot be readily obscured by dirt, and that it will give a great diffusion of light, and will also throw the light to one side of the lens.

To this end my invention consists in a lens for illuminating-tiles, which lens is constructed substantially as hereinafter described and claimed.

Reference is to be had to the accompanying drawings, forming a part of this specification, in which similar figures of reference indicate corresponding parts in all the views.

Figure 1 is an inverted perspective view of a lens embodying my invention. Fig. 2 is a side elevation of the same, looking edgewise upon the lugs. Fig. 3 is a side elevation, looking upon the sides of the lugs. Fig. 4 is an inverted perspective view showing the lenses secured in a frame, and Fig. 5 is an inverted perspective view of a modified form of lens.

The lens 10 is flat for the most part, and, as shown in the drawings, is square; but it may be made circular or in any desired shape, and its surface may be more or less rounded if desired. The lens is provided on the under side and near opposite edges with lugs 11 and 12, which are vertical on one side and inclined on the other, the points of the lugs being arranged downward, and the lug 11 is long enough to extend nearly across the tile, while the lugs 12 are much shorter and are placed opposite the lug 11, an opening being left between them, so that the rays of light from the the lug 11 may be directed through the opening and into the space below.

The lenses are secured in a frame 13 in any of the common ways, and any suitable frame may be used, and it is obvious that the outer edges of the lenses may be shaped to conform with the kind of frame in which they are to be supported. The lenses are arranged, as described, with the lugs extending downward, and the rays of light, which pass downward through each lens, will be deflected by the lugs 11 and 12 and thrown to one side of the lens, so as to light the space at one side as well as the space which is immediately beneath the lens.

The lugs are arranged in the drawings with their inclined sides in the same direction, but they may be differently arranged, if desired, and the inclination of the lugs is according to the direction in which the light is to be deflected. If desired, the long lug may be dispensed with and two of the smaller lugs 12 substituted for it, a space being left between them, as shown in Fig. 5, and there will thus be two lugs on opposite sides of the lenses, and a fifth lug of the same kind may be placed centrally between them. A lens constructed in this manner will have much the same effect as the lens shown in the main views, and it is obvious that in either case the lugs will not be readily covered by dirt, and if more or less dirt should collect between them the light will still pass downward through the lugs and be diffused into the space beneath and at one side of them.

Having thus fully described my invention, I claim as new, and desire to secure by Letters Patent—

1. In illuminating-tiles, a lens having a series of lugs of dissimilar lengths on one side, the lugs having one side perpendicular to the base-line of the lens and the opposite side inclined, substantially as described.

2. In illuminating-tiles, a lens having parallel rows of inclined lugs on its under side, the lugs being arranged so that the body of one will come opposite the opening between the opposite lugs, substantially as described.

CHARLES W. MARK.

Witnesses:
WARREN B. HUTCHINSON,
E. M. CLARK.